United States Patent [19]
Crosby et al.

[11] 3,995,094
[45] Nov. 30, 1976

[54] HALOMETHYLATION OF POLYSTYRENE

[75] Inventors: Guy A. Crosby, Palo Alto, Calif.;
Masao Kato, Moscow, Idaho

[73] Assignee: Dynapol Corporation, Palo Alto, Calif.

[22] Filed: Sept. 12, 1975

[21] Appl. No.: 612,822

[52] U.S. Cl. .................................... 526/46; 526/21
[51] Int. Cl.² ........................... C08F 8/24; C08F 8/10
[58] Field of Search ............... 260/93.5 A; 450/618; 526/46

[56] References Cited
UNITED STATES PATENTS

| | | | |
|---|---|---|---|
| 2,694,702 | 11/1954 | Jones | 260/93.5 A |
| 3,311,602 | 3/1967 | Raley | 260/93.5 A |
| 3,625,870 | 12/1975 | Norwood | 260/93.5 A X |

OTHER PUBLICATIONS

Synthesis by G. A. Olah et al., p. 560 (1974).

*Primary Examiner*—William F. Hamrock
*Attorney, Agent, or Firm*—William H. Benz

[57] ABSTRACT

Polystyrene is halomethylated by contact with a solution of halomethoxybutane in a reaction medium (preferably halohydrocarbon) in the presence of a transition metal halide catalyst at a temperature of from about 5° C to about 100° C.

13 Claims, No Drawings

HALOMETHYLATION OF POLYSTYRENE

BACKGROUND OF THE INVENTION

This invention relates to the production of halomethylated polystyrene also denominated poly(halomethylstyrene). More particularly, it relates to a new method for forming this material by halomethylating polystyrene.

Chloromethylated polystyrene and, to a somewhat lesser extent, bromomethylated polystyrene are established commercial materials. These materials probably find their largest use as precursors to ion exchange resins. They also are now finding increasing utility as substrates for the attachment of active groups to yield polymeric reagents.

Conventionally, the halomethylstyrenes have been formed by reacting polystyrene with a halomethyl methyl ether, especially chloromethyl-methyl ether, Cl—CH$_2$—O—CH$_3$, in the presence of aluminum trichloride or an equivalent Friedel-Crafts alkylation catalyst. Recent findings have made this method unattractive, however. Chloromethyl-methyl ether has been placed on the Federal Government's OSHA (Occupational Safety and Health Act) list of compounds whose use is restricted because of potential carcinogenicity. Additionally, commercially available chloro-methylmethyl ether or the bromo equivalent generally contains a small amount (1–3%) of di-halomethyl ethers, (Br—CH$_2$—O—CH$_2$—Br or Cl—CH$_2$—O—CH$_2$—Cl) which materials are known to be highly carcinogenic.

This problem has required the use of new ultra-safe facilities to produce the chloromethylated polystyrene product. The cost of such facilities is prohibitively high and has forced up the price of the finished chloromethylated polystyrene product among large producers or has driven smaller producers out of the business.

A new method for preparing halomethylated polystyrene which did not require halomethyl-methyl ether thus would be of advantage.

STATEMENT OF THE INVENTION

It has now been found that poly(halomethylstyrene) can be produced by reacting solid polystyrene with a halomethoxybutane, especially a 1,4-bis(halomethoxy)butane, at a temperature of from about 5° C to about 100° C in an organic liquid phase reaction medium in the presence of a transition metal halide Friedel-Crafts catalyst. It has also been found that this reaction occurs with improved efficiency when the organic liquid phase reaction medium is selected from among the lower haloalkyls.

DETAILED DESCRIPTION OF THE INVENTION

The Halomethoxybutane

A 4-substituented-1-halomethoxybutane is employed as the chloromethylation reagent in the process of this invention. A 4-substituented-1-halomethoxybutane is defined to be a four carbon linear alkyl having an —O—CH$_2$—X group covalently bonded to its number 1 carbon atom and a substituent selected from —O—CH$_2$—X and X$^1$ covalently bonded to its number 4 carbon, wherein X is a halogen selected from —Cl and —Br and X$^1$ is a halogen independently selected from —Cl and —Br.

Thus there are in total six agents useful in the process of the invention and these are as follows:

1,4-bis(chloromethoxy)butane
1,4-bis(bromomethoxy)butane
1-chloromethoxy-4-chlorobutane
1-bromomethoxy-4-bromobutane
1-chloromethoxy-4-bromobutane
1-bromomethoxy-4-chlorobutane.

These compounds are believed to be of recent discovery. It is thought that the general description of these materials in *Synthesis* (1974) at page 560 by G. A. Olah et al is the first published description of them. In passing, it is noted that Olah et al, in contrast to the present process, employed these compounds in nonsolvented systems to halomethylate neat liquid aromatic aromatic hydrocarbons.

The 1,4-bis(halomethoxy)butanes are preferred chloromethylating agents. The 1-halomethoxy-4-halobutanes give excellent results but are more costly and difficult to prepare and thus are less preferred. A most preferred halomethoxybutane is 1,4-bis(chloromethoxy)butane.

The halomethoxybutanes may be prepared as follows: The 1,4-bis(halomethoxy)butanes are formed by contacting 1,4-butane diol with paraformaldehyde in the presence of a hydrogen halide. This reaction is carried out at a low to moderate temperature such as from about 0° C to about 25° C. An excess of hydrogen halide over the stoiciometric requirements is employed. The reaction time is from 0.5 to 15 hours. The product, 1,4-bis (chloromethoxy)butane or 1,4-bis(bromomethoxy)butane, generally forms a separate isolable liquid phase which can be recovered by decantation and thereafter treated, such as by rinsing and drying, and distilled to yield the desired 1,4-bis(halomethoxy) butane as a relatively pure material.

The 1-halomethoxy-4-halobutanes are formed in a similar fashion from paraformaldehyde, 4-halo-1-butanol and hydrogen halide gas by employing a low to moderate temperature, such as 0° C to about 50° C, preferably from about 0° C to about 25° C for periods of from 0.5 hours to about 10 hours. After reaction and addition to saturated brine, the organic phase which separates contains the desired 1-halomethoxy-4-halobutane. This compound can be isolated in essentially pure form by vacuum distillation.

The Polystyrenes

The polystyrenes which are chloromethylated by this invention are solids. They also are characterized as being cross-linked. They may be microporous or macroporous. They may be macroreticular. The exact choice of the polystyrene between macroporous, microporous, etc. is dictated by the desired end use in accord with art-known principles.

The solid polystyrenes can be prepared from styrene and a suitable cross-linker such as divinylbenzene by methods known in the art. A large number of suitable crosslinked polystyrenes are commercially available. Examples of commercially available polystyrenes include Rohm and Haas Amberlite brand XAD-1, a polymeric sytrene having an average pore diameter of 200 A and a pore volume of 37%; XAD-2, a polymeric styrene having an average pore diameter of 90 A and a pore volume of 42%; and XAD-3, a polymeric styrene having an average pore diameter of 50 A and a pore volume of 51%. Rohm and Haas Amberlite XE-305 a polymeric styrene having an average pore diameter of 900 A. Preferred polystyrenes are particulate solid polystyrenes containing from 0.1 to 4% by weight of divinylbenzene as cross-linking agent.

The polystyrene may be in any form desired, but generally is in the form of small particles or pellets.

The Reaction Medium

A very important element of this invention is the selection of a proper reaction medium in which to carry out the chloromethylation reaction.

A useful reaction medium must dissolve the halomethoxybutane agent. It must be liquid at the reaction temperature and at a pressure of not more than about 100 psi. It must be compatible with and not react with the Friedel-Crafts catalyst, the polystyrene or the halomethoxybutane. Such a reaction medium is defined herein as a "Friedel-Crafts liquid reaction medium" and any material which meets these criteria may be used. Many, if not most, common organic liquids fail to meet these qualifications, however. Aromatic hydrocarbons such a benzene, toluene and the like react and undergo halomethylation. Lower alkanols and diols deactivate the catalysts. Carbon disulfide, a usual Friedel-Crafts medium, may be used as reaction medium. Nitroalkanes or nitroaranes fit these qualifications and fit the definition of a "Friedel-Crafts liquid reaction medium". Examples of these materials are nitrobenzene, nitromethane, nitroethane, and the like. A preferred group of materials which, in addition to providing a suitable reaction medium, appear to have an unexpected substantial promotion effect on the reaction are the lower haloalkanes, that is 1 to 3 carbon alkanes having at least 1 halo, especially chloro or bromo, substituent. Such materials include methylene dichloride, chloroform, 1,1-dichloroethane; 1,2-dichloroethane; 1,1,1-trichloroethane; 1-chloropropane; 1,1,2,2-tetrachloroethane; and the like. Preferred as reaction media are methylene dichloride and chloroform.

The Catalyst

The halomethylation of this invention occurs in the presence of a metal halide catalyst. Useful catalysts include the known Friedel-Crafts catalysts such as $BF_3$, $AlCl_3$, $SnCl_4$, $ZnCl_2$, $ZnBr_2$, $SbCl_5$ and $MgBr_2$. It is preferred to use a "mild" Friedel-Crafts catalyst especially one which is soluble in the reaction medium employed with special preference being given to $SnCl_4$ and $ZnCl_2$.

The Reaction Conditions

The halomethylation reaction of this invention is very facile when the reaction medium, catalyst, and reactants are properly selected. The reaction temperature should be between about 5° C and about 100° C, preferably from about 10° C to about 80° C. The reaction is generally carried out at atmospheric pressure unless the atmospheric boiling point is below the temperature desired, in which case an elevated pressure should be employed. The reaction time required is inversely proportional to the reaction temperaure. Times in the range of from about 0.5 to about 24 hours are used. As a rule, if the temperature is 50° C or above, times of from 0.5 to about 12 hours are useful at temperatures below 50° C, times from about 12 to about 24 hours are useful.

The ratio of reactants may be varied to achieve the degree of chloromethylation desired. The mole ratio of polystyrene to halomethoxybutane should be maintained from about 2.0 to 1 to about 1 to 3.0 and preferably is from 1 to 1 to about 1 to 2. A catalytically effective amount of catalyst (that is an amount sufficient to cause an adequate rate of reaction) is employed. This amount ranges from about 0.001 to about 1.0 moles of catalyst per mole of polystyrene with amounts of catalyst of from 0.005 to 0.1 moles per mole being preferred. The concentration of reactants and catalyst, which is controlled by the amount of reaction medium employed, does not appear to be critical as long as a sufficient volume of liquid is provided to fully cover the solid beads of polystyrene. Amounts of reaction medium which result in a starting concentration of halomethoxybutane of from about 0.1 molar to about 10 molar are useful, with amounts which result in a starting concentration of halomethoxystyrene of from about 0.5 molar to about 7 molar being preferred.

The chloromethylation reaction has been carried out in a batch mode. It is, of course, possible to propose a continuous mode wherein polystyrene beads, reaction medium, catalyst and halomethoxybutane are continuously fed to a backmixed or plug flow reactor and a mixture of spent catalyst, residual halomethoxybutane, reaction medium and chloromethylated polystyrene beads are continuously removed.

Following reaction, the chloromethylated polystyrene is recovered. This is accomplished by simple solid/liquid separation methods such as by screening out the solid polystyrene beads when a soluble catalyst is employed. If an insoluble catalyst is used, there can be a problem separating the catalyst from the beads. This is simplified greatly by using a finely powered catalyst which can be rinsed off of the solid beads with a liquid (i.e., THF, THF-water, water, MeOH then $Et_2O$).

The invention will be further described by the following Examples. These are provided to illustrate the invention and are not to be construed as limiting its scope, which scope is instead defined by the appended claims.

EXAMPLE I

A. Paraformaldehyde (40 g) and 1,4-butadiol (60 g) were mixed together in a flask. The mixture was cooled to about 7° C in a cold water bath and hydrogen chloride gas was passed into the flask for 7 hours. The mixture was then chilled to 0° C overnight during which time it separated into two layers. The upper layer was collected, washed, dried with magnesium sulfate and vacuum distilled to yield 58 g of 1,4-bis(chloromethoxy)butane

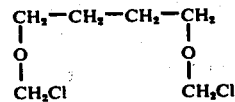

B. To a stirred suspension of 2.08 g (0.02 mol) of crosslinked polystyrene (Amberlite XE-305, Rohm and Haas - 2% divinylbenzene crosslinking) and 7.48 g (0.04 mol) of the 1,4-bis (chloromethoxy)butane of Part A of this Example in 20 ml of methylene chloride was slowly added 1.0 ml (0.0085 mol) of stannic chloride at 0° C. The reaction mixture was stirred at room temperature overnight (16 – 18 hours). The mixture was then cooled to 0° C and treated with 30 ml of 1N hydrochloric acid. The polymer beads were recovered by filtration, washed with water-dioxane, dioxane, methanol and methylene chloride. The beads were dried overnight in vacuo at room temperature. The resulting beads were analyzed for chlorine content. If each styrene ring had received one chloromethyl group the resulting product would have had a chlorine content of 23.2%. The analysis showed 18.1% (5.09 mmol of Cl/g) which means that 78% of the rings were chloromethylated.

A portion of the product was ground to a powder and mixed with dry potassium bromide and formed into a solid pellet for infrared analysis. A comparison of the resulting spectrum with a spectrum made from material prepared by the classical method with chloromethyl methyl ether showed the materials to be essentially the same. Both materials showed absorbance peaks at (KBr pellet) 3.39, 6.23, 6.62, 6.70, 9.10, 11.05, 12.0, 13.2 and 14.3 μ.

C. The poly(chloromethylstyrene) beads of Part B of this Example are put to three uses. One portion is employed in the manufacture of a polymeric boron reagent in accordance with the teachings of United States Patent Application Ser. No. 456,731 filed on Apr. 1, 1974 by Guy A. Crosby which application is herein expressly incorporated by reference. 0.5G of beads is suspended in 5 ml of tetrahydrofuran and 2 ml of hexamethylphosphoric triamide. The mixture is cooled to 0° C and treated with 0.75 ml of aqueous potassium methyl sulfide. Additional hexamethyl-phosphoric triamide is added until a homogeneous liquid phase forms. The suspension is heated to 50° C for 12 hours, cooled, filtered and the beads thus recovered and washed with base, water, cold HCl/dioxane, water/dioxane, dioxane and ether. The beads are then dried to yield poly(vinylbenzylmethylsulfide)

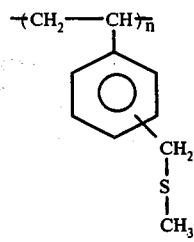

This product is then contacted with diborane gas to form the industrially useful polymeric borane reducing reagent.

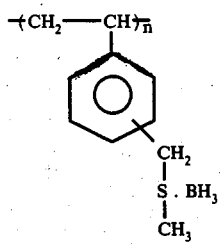

Another portion is converted into two types of ion exchange resin. One type of resin is formed when 0.25g of the chloromethylated beads are contacted with trimethylamine or dimethylethanolamine in accordance with the teachings of C. H. McBurney in his U. S. Pat. No. 2,591,573, issued in 1952 (which patent is herein incorporated by reference) to yield resins of the formulae

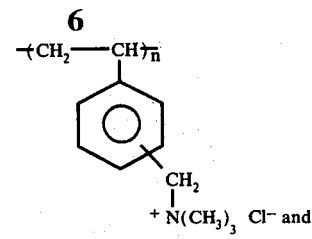

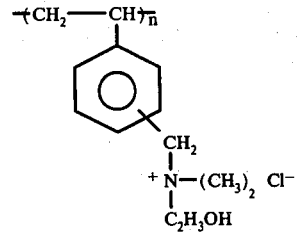

These resins are similar to the commercial Rohm and Haas products Amberlite IRA 400 and Amberlite IRA 410.

An additional type of resin similar to Amberlite IR 45 is formed when 0.25 g of the product of Part B of this Example is contacted with a polyamine such a $H_2N(CH_2CH_2NH)_3H$ to yield the weak base anion exchange resin

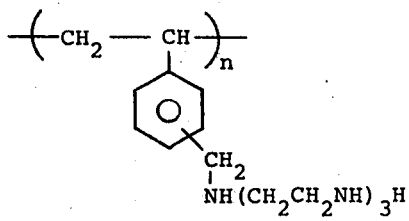

in accordance with the teachings of U.S. Pat. No. 2,591,574 also issued to C. H. McBurney in 1952 and also herein incorporated by reference.

In the third use, 1.0 g of the beads of chloromethylated product of Part B was stirred in 10 ml of dimethylformamide. The temperature was raised to 100° C and 1.20 g of phthalimide potassium salt was added. The mixture was stirred overnight at 100° C. The mixture was cooled and the beads were filtered, washed with water, dioxane, methanol and ether, and dried to yield 1.46 g of beads. These contained 3.11 mmol/g of nitrogen (4.35% by weight) indicating that 89% of the available chlorines had been converted to the phthalimide. The IR spectrum of this product was essentially the same as that of

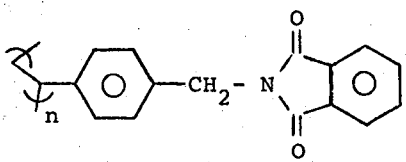

prepared by the method of Weinshenker et al. Tet. Let. p 3281 (1972). (Absorption at 3.40, 5.66, 5.90, 7.05, 7.24, 7.52, 9.17, 10.9 and 14.0 μ.)

EXAMPLES II through XV

The chloromethylation of polystyrene demonstrated in Part B of Example I is repeated 14 times varying the reaction solvent and the molar ratio of the reactants and the catalyst as shown in Table I. Also included in this table are the products of these reactions. Comparison of the products of Examples I through XV shows (1) that chloromethylation proceeds much more facilely when a halohydrocarbon solvent is employed and (2) that the degree of chloromethylation is a function of the concentration of catalyst employed. It will be noted, however, that the reaction does occur, albeit more slowly, when non-halohydrocarbon solvents are employed.

$-15°$ C by the use of a cold water bath. After no more evidence of reaction is observed the reaction mixture is extracted with saturated brine. The organic layer contains the product. The organic layer is dried with $MgSO_4$ and vacuum distilled to yield 1-chloro-4-chloromethoxybutane.

B. The chloromethylation of styrene of Part B of Example I is repeated with the change that the product of Part A of this example is substituted for the 1,4-bis(chloromethoxy)butane used therein. Essentially equivalent results are obtained.

TABLE I

| EXAMPLE NO. | REACTANTS, MOL | | Catalyst | SOLVENT | Ml | REACTION CONDITIONS temp/time | CHLORINE IN PRODUCT mmol/g |
| | Polystyrene | 1,4-bis(chloromethoxy)butane | $SnCl_4$ | | | | |
| --- | --- | --- | --- | --- | --- | --- | --- |
| II | 0.1 | 0.04 | 0.04 | $CH_3NO_2$ | 100 | 60° C/4 hr | 0.03* |
| III | 0.02 | 0.02 | 0.02 | $CH_3NO_2$ | 20 | 65° C/5 hr | 1.91* |
| IV | 0.02 | 0.02 | 0.02 | $CH_3NO_2$ | 3 | 65° C/5 hr | 1.28* |
| V | 0.02 | 0.02 | 0.02 | $CH_3NO_2$ | 5 | r.t./24 hr | 1.31* |
| VI | 0.02 | 0.06 | 0.02 | $CHCl_3$ | 5 | r.t./24 hr | 6.06 |
| VII | 0.0155 | 0.0155 | 0.0087 | $CHCl_3$ | 10 | r.t./24 hr | 4.96 |
| VIII | 0.02 | 0.04 | 0.017 | $CH_2Cl_2$ | 15 | r.t./17 hr | 5.67 |
| IX | 0.02 | 0.04 | 0.013 | $CHCl_3$ | 20 | r.t./17 hr | 5.09 |
| X | 0.02 | 0.04 | 0.0085 | $CHCl_3$ | 20 | r.t./5 hr | 4.39 |
| XI | 0.02 | 0.04 | 0.0085 | $CH_2Cl_2$ | 20 | r.t./20 hr | 5.09 |
| XII | 0.02 | 0.04 | 0.0085 | $ClCH_2CH_2Cl$ | 20 | r.t./20 hr | 5.54 |
| XIII | 0.02 | 0.04 | 0.0085 | $C_6H_5NO_2$ | 20 | r.t./20 hr | 4.59 |
| XIV | 0.02 | 0.04 | 0.0085 | $CH_3NO_2$ | 20 | r.t./20 hr | 1.31 |
| XV | 0.02 | 0.04 | 0.0085 | $CS_2$ | 20 | r.t./20 hr | 3.92* |

*Color of beads was very dark.

EXAMPLE XVI

A. The preparation of Example I, Part A, is repeated with one modification. In place of hydrogen chloride, an excess of hydrogen bromide is employed. This results in 1,4-bis(bromoethoxy)butane being formed as a product.

B. The preparation of Example I, Part B, is repeated with two modifications. First, in place of the 1,4-bis(-chloromethoxy) butane used in Example I, 1,4-bis(-bromomethoxy)butane is employed. Further, instead of Amberlite XE-305, Amberlite XAD-2 is used. The resulting product contains a bromomethyl group on about 75–85% of its aromatic rings.

EXAMPLES XVII – XX

The chloromethylation of step B of Example I is repeated four times with various modifications.

In Example XVII, ethylene dichloride is used as reaction medium and functions equivalently to methylene dichloride.

In Example XVIII, zinc bromide is used as catalyst in place of and in a molar amount equivalent to the stannic chloride used in Example I. Equivalent results are obtained.

In Example XIX, zinc chloride is used as catalyst in place of and in a molar amount equivalent to the stannic chloride used in Example I. Equivalent results are obtained.

In Example XX, the reaction of step B of Example I is repeated changing the reaction time to 4 hours and the reaction temperature to 60° C. A product essentially equivalent to that of Example I, Part B results.

EXAMPLE XXI

A. 4-chloro-1-butanol (10 g) is added to 5 g of paraformaldehyde. An excess of hydrogen chloride gas is added and the reaction temperature is maintained at 5°

EXAMPLE XXII

The preparation of Part A of Example XXII is repeated with one modification - hydrogen bromide gas is used in place of hydrogen chloride gas. The resulting product is 1-chloro-4-bromomethoxybutane.

This product is used in the reaction of step B of Example I, in place of 1,4-bis(chloromethoxy)butane. The polystyrene product is bromoethylated polystyrene.

EXAMPLE XXIII

The preparation of Part A of Example XXI is repeated with one modification. 15 G of 4-bromo-1-butanol is substituted for the 10 g of 4-chloro-1-butanol. The resulting product is 1-bromo-4-chloromethoxybutane which when used in the reaction of Part B of Example I effects facile chloromethylation of polystyrene.

EXAMPLE XXIV

The preparation of Example XXII is repeated with one modification. 15 G of 4-bromo-1-butanol is substituted for the 10 g of 4-chloro-1-butanol. The resulting product is 1-bromo-4-bromomethoxybutane.

This product is used in the reaction of step B of Example I in place of the 1,4-bis(chloromethoxy)butane. The polystyrene product is bromoethylated polystyrene.

We claim as our invention:

1. The process of producing poly(halomethylstyrene) selected from the group consisting of poly(chloromethylstyrene) and poly(bromomethylstyrene) by reacting solid polystyrene with halomethoxybutane selected from the group consisting of 1,4-bis(chloromethoxy)-butane; 1,4-bis(bromomethoxy)butane; 1-chloromethoxy-4-chlorobutane; 1-bromomethoxy4-bromobutane; 1-chloromethoxy-4-bromobutane; and 1-bromomethoxy-4-chlorobutane at a temperature of from about 5° C to about 100° C in an added Friedel-Crafts liquid organic reaction medium in the presence of a transition metal halide Friedel-Crafts catalyst.

2. The process of claim 1, wherein the halomethoxybutane is 1,4-bis(bromomethoxy)butane.

3. The process of claim 1, wherein the halomethoxybutane is 1,4-bis(chloromethoxy)butane.

4. The process of claim 1 wherein the halomethoxybutane is 1-chloromethoxy-4-chlorobutane.

5. The process of claim 1, wherein the halomethoxybutane is 1-chloromethoxy-4-bromobutane.

6. The process of claim 1, wherein the transition metal halide Friedel-Crafts catalyst is selected from the group consisting of $SnCl_4$, $ZnCl_2$, $ZnBr_2$, $MgBr_2$ and $BF_3$.

7. The process of claim 6, wherein the transition metal halide Friedel-Crafts catalyst is selected from the group consisting of $SnCl_4$ and $ZnCl_2$.

8. The process of claim 1 wherein the added liquid reaction medium is selected from the group consisting of carbon disulfide, nitroalkanes, nitroaranes and 1 to 3 carbons lower haloalkanes having at least one bromo or chloro substituent.

9. The process of claim 8, wherein the added liquid reaction medium is selected from the group consisting of 1 to 2 carbon chloro and bromoalkanes.

10. The process of claim 3, wherein the added liquid reaction medium is selected from the group consisting of 1 to 2 carbon chloro and bromoalkanes.

11. The process of claim 9, wherein the ratio of polystyrene to halomethoxybutane is from 0.3 to 2 moles of polystyrene per mole of halomethoxybutane and the ratio of catalyst to polystyrene is from 0.001 to 1.0 moles of catalyst per mole of polystyrene and a reaction time of from 0.5 to 24 hours is employed.

12. The process of claim 1, wherein the polystyrene is cross-linked.

13. The process of claim 12, wherein the polystyrene is macroporous.

* * * * *